(12) United States Patent
Rudnev et al.

(10) Patent No.: US 9,060,390 B2
(45) Date of Patent: Jun. 16, 2015

(54) ELECTRIC INDUCTION HEAT TREATMENT OF WORKPIECES HAVING CIRCULAR COMPONENTS

(75) Inventors: Valery I. Rudnev, Rochester Hills, MI (US); Don L. Loveless, Rochester, MI (US)

(73) Assignee: INDUCTOHEAT, INC., Madison Heights, MI (US)

( * ) Notice: Subject to any disclaimer, the term of this patent is extended or adjusted under 35 U.S.C. 154(b) by 1022 days.

(21) Appl. No.: 13/075,957

(22) Filed: Mar. 30, 2011

(65) Prior Publication Data

US 2011/0240633 A1    Oct. 6, 2011

Related U.S. Application Data

(60) Provisional application No. 61/320,110, filed on Apr. 1, 2010.

(51) Int. Cl.
*H05B 6/10* (2006.01)
*B65G 19/02* (2006.01)
*B65G 19/22* (2006.01)

(52) U.S. Cl.
CPC .......... *H05B 6/103* (2013.01); *H05B 6/102* (2013.01); *B65G 19/02* (2013.01); *B65G 19/225* (2013.01)

(58) Field of Classification Search
None
See application file for complete search history.

(56) References Cited

U.S. PATENT DOCUMENTS

| | | | | |
|---|---|---|---|---|
| 3,251,976 A | * | 5/1966 | McBrien | 219/653 |
| 3,466,414 A | * | 9/1969 | Balzer | 219/641 |
| 4,288,673 A | * | 9/1981 | Ishibashi | 219/653 |
| 4,340,801 A | * | 7/1982 | Ishibashi et al. | 219/657 |
| 4,442,332 A | * | 4/1984 | Jackson et al. | 219/652 |
| 2008/0073181 A1 | * | 3/2008 | Henderson et al. | 198/728 |

FOREIGN PATENT DOCUMENTS

| | | | |
|---|---|---|---|
| GB | 1490418 A | * | 11/1977 |
| JP | 2003-290812 A | | 10/2003 |
| JP | 2005-347069 A | | 12/2005 |
| JP | 2006-310198 A | | 11/2006 |
| JP | 2008-171585 A | | 7/2008 |

* cited by examiner

*Primary Examiner* — Joseph M Pelham
(74) *Attorney, Agent, or Firm* — Philip O. Post

(57) ABSTRACT

A cylindrical workpiece is mounted between opposing friction and non-friction guide rails and pushed through an induction coil arrangement by a pusher element positioned relative to the workpiece so that the pusher element introduces a force that moves the workpiece linearly forward within the induction coil arrangement between the two guide rails and rotationally by kinetic friction of the workpiece with the friction rail.

20 Claims, 4 Drawing Sheets

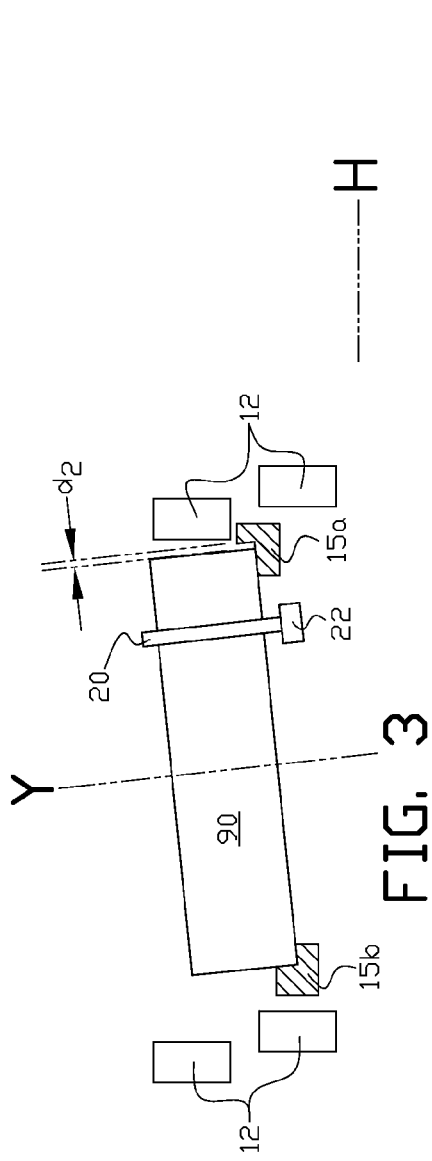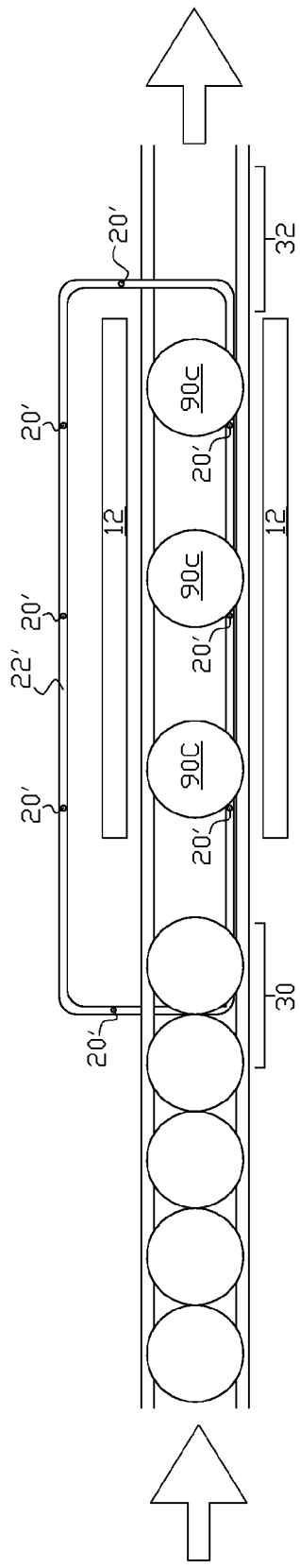

ELECTRIC INDUCTION HEAT TREATMENT OF WORKPIECES HAVING CIRCULAR COMPONENTS

CROSS REFERENCE TO RELATED APPLICATIONS

This application claims the benefit of U.S. Provisional Application No. 61/320,110, filed Apr. 1, 2010, hereby incorporated by reference in its entirety.

FIELD OF THE INVENTION

The present invention relates to electric induction heat treatment of circular workpieces, or workpieces having circular components wherein the circular workpiece or component is rotated during the induction heat treatment process.

BACKGROUND OF THE INVENTION

Circular workpieces, or workpieces formed from, or having circular components, for example, in the shape of right cylinders, such as a disk or ring, find use in many applications where the component must be metallurgically hardened to withstand forces applied to the workpiece in the application. For example a metallic disk-shaped component is used in wheel hubs, and complex automotive constant velocity joints. In addition to workpieces that are formed completely in the shape of a right cylinder, complex workpieces can consist of multiple components that include a right cylinder-shaped component such as the gear blank 91 shown in FIG. 1(a). U.S. Pat. No. 3,251,976 illustrates one method of induction heat treating a gear blank. For convenience the above described right cylinder-shaped workpieces, and complex workpieces comprising at least one right cylinder-shaped component, will be referred to as a cylindrical or circular workpiece.

Various types of induction coils can be utilized to induction heat treat a cylindrical workpiece. Since induction heating of a workpiece is dependent upon magnetic flux coupling with portions of the workpiece to induce the eddy current heating in the workpiece, uniform inductive heat treatment throughout the entire workpiece is difficult to achieve with some induction coil arrangements. The inductive heating process is further complicated by the fact that generally heat penetration into the interior of the workpiece is a combination of both inductive eddy current heating inwardly, and then further conductive inward heat transfer from the eddy current regions (controlled by the depth of current penetration) towards the central region of the workpiece, which conductive heating process is known in the art as heat "soaking"

FIG. 1(b) and FIG. 1(c) illustrate one method of inductive heat treatment of cylindrical workpieces. Cylindrical workpieces 90a, 90b and 90c are sequentially fed within two-turn channel inductor 12, which is suitably connected to an alternating current power source. Workpiece flow within the inductor is from left to right as indicated by the arrow at the entry of the induction furnace. A suitable conveyor apparatus 92 (shown diagrammatically) is used to linearly transport the workpieces within the inductor. Side guides 94 can be provided either separate from, or integral to, the conveyor apparatus, to keep the workpieces linearly aligned as they move linearly within the inductor. Since magnetic flux (established by alternating current flow in the inductor) coupling with the cylindrical workpieces is achieved at the sides of the workpieces adjacent to the inductor as illustrated by typical flux lines 96 in FIG. 1(c), inductive eddy current heating (depth of current penetration) is initially concentrated in (dark shaded) regions 90' as shown for workpiece 90c in FIG. 1(b), with progressive inward heat soaking of the workpieces as they travel within the inductor as shown for workpieces 90a and 90b. Consequently internal heating is uneven through the entire mass of the workpiece, as illustrated by the cooler white regions in each of the workpieces. Rotation of the workpieces during the inductive heating process has been recognized as a solution to the uneven heating but apparatus for accomplishing the rotation are complex and increases the total equipment cost.

One object of the present invention is to provide a simplified apparatus and method for rotation of a cylindrical workpiece during an induction heat treatment process.

BRIEF SUMMARY OF THE INVENTION

In one aspect the present invention is a method of, and apparatus for, moving a circular workpiece through an induction coil arrangement. A circular workpiece is mounted between opposing friction and non-friction guide rails and pushed through the induction coil arrangement by a pusher element positioned relative to the workpiece so that the pusher element introduces a force that moves the workpiece linearly forward between the two guide rails and rotationally by kinetic friction of the workpiece with the friction guide rail.

In another aspect the present invention is a method of induction heat treatment for a circular workpiece. The circular workpiece is placed on a horizontal and lateral support structure disposed within an induction coil with a side of the circular workpiece vertically oriented to transport the circular workpiece from a coil entry position to a coil exit position. The side of the circular workpiece makes contact at a location off center from the central axis of the circular workpiece with a workpiece pusher element connected to a drive apparatus for moving the workpiece pusher element through the induction coil so that contacting the side of the circular workpiece with the workpiece pusher element simultaneously rotates the circular workpiece in the horizontal and lateral support structure and advances the circular workpiece through the induction coil.

In another aspect the present invention is an induction heat treatment apparatus for a circular workpiece. A horizontal and lateral support structure is disposed within the induction coil for transporting the circular workpiece disposed on the horizontal and lateral support structure through the induction coil. A drive apparatus is connected to the workpiece pusher element and oriented so that a workpiece pusher element engages the side of the circular workpiece at a location off center from the central axis of the circular workpiece to simultaneously rotate the circular workpiece in the horizontal and lateral support structure and advance the circular workpiece through the induction coil when the drive apparatus is activated.

In all examples of the invention the circular workpiece may be a component of a more complex shaped workpiece that may have one or more components that are not heat treated while the circular workpiece component is heat treated.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims:

FIG. 3 an elevation view of an alternative apparatus and method of the present invention for inductively heat treating a cylindrical workpiece or the cylindrical component of a complex workpiece.

FIG. 4 is a top plan view of another apparatus of the present invention for inductively heat treating a cylindrical workpiece or the cylindrical component of a complex workpiece.

DETAILED DESCRIPTION OF THE INVENTION

Figure 1A:
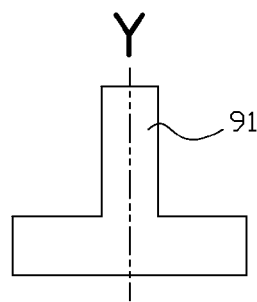
FIG. 1(a) illustrates a complex workpiece where at least one of the components of the workpiece is in the shape of a right cylinder.
Figure 1B:
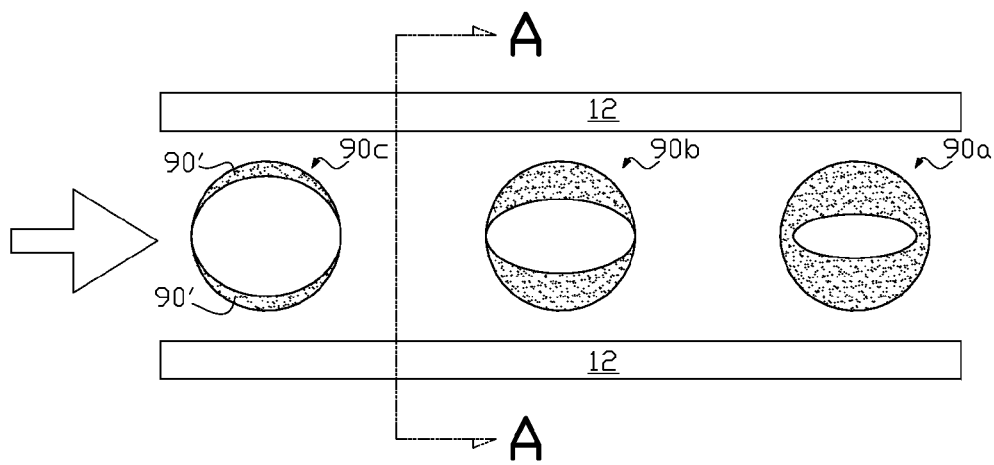
FIG. 1(b) is a top plan view and FIG. 1(c) is an elevation view through line A-A in FIG. 1(b) of an apparatus and method of inductively heat treating a cylindrical workpiece or the cylindrical component of a complex workpiece.
Figure 1C:
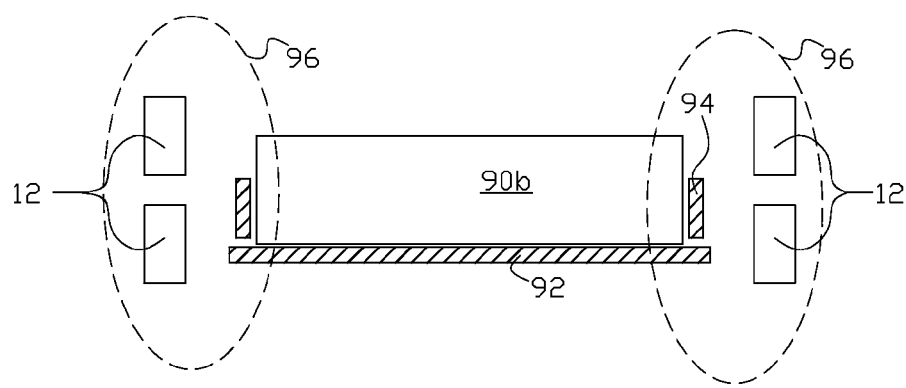
Figure 2A:
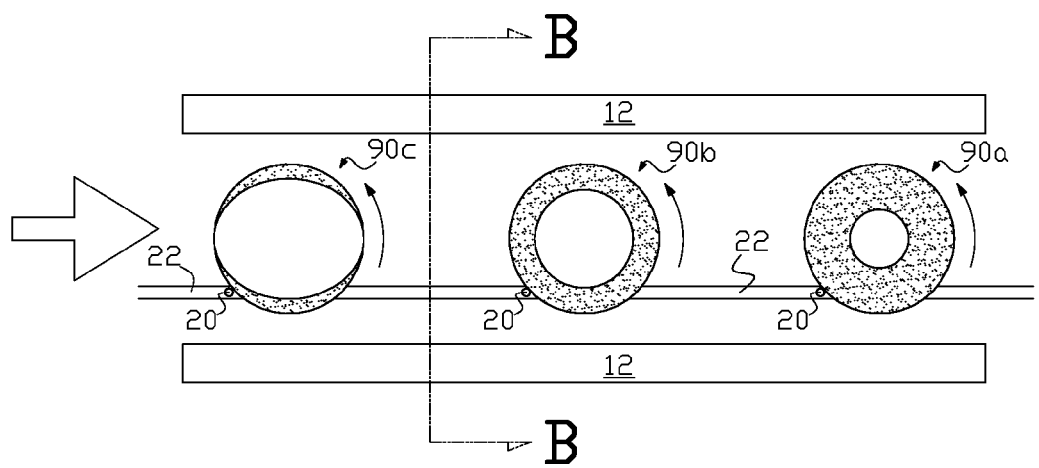
FIG. 2(a) is a top plan view and FIG. 2(b) is an elevation view through line B-B in FIG. 2(a) of an apparatus and method of the present invention for inductively heat treating a cylindrical workpiece or the cylindrical component of a complex workpiece.
Figure 2B:
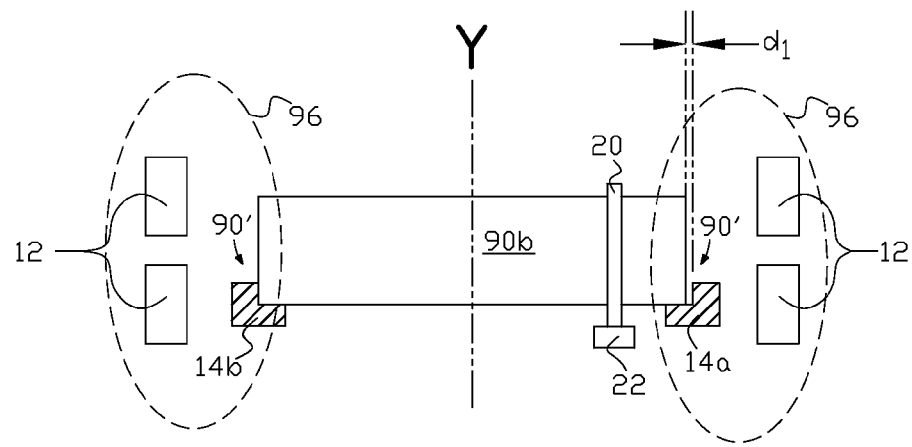

FIG. 2(a) and FIG. 2(b) illustrate one example of the apparatus and method of the present invention. In the figures guide rails 14a and 14b (not shown in FIG. 2(a) for clarity) provide horizontal support and lateral guidance of circular workpieces 90a, 90b and 90c as they travel within inductor 12. In this example of the invention, the guide rails contact the lower side portion and outer bottom portion of the circular workpiece at opposing side tangents 90' to the circular workpiece as further described below. The guide rails may incorporate a range of adjustability to accommodate workpieces of varying diameters.

Workpiece pusher elements 20, for example pins or posts, are attached to a drive apparatus, for example, a powered belt or chain 22 (partially shown) and arranged relative to each workpiece so that a pin associated with a workpiece applies an off-workpiece-central axis (Y) force to the workpiece that in combination with guide rails 14a and 14b moves the workpiece linearly forward within the inductor and rotates the workpiece by virtue of a kinetic friction force between portions of the workpiece that come in contact with surfaces of friction guide rail 14b in the particular orientation shown in this non-exclusive example of the invention.

FIG. 3 illustrates an alternative embodiment of the invention wherein guide rails 15a and 15b are skewed relative to each other from horizontal (H) so that the workpiece 90 applies a large side force component against the side wall and interior bottom of rail 15b, and not on rail 15a, which results in a large kinetic friction force between rail 15b and opposing workpiece contact surfaces that enhances rotation of the workpiece as it travels through the induction furnace. A similar effect is achieved in the example shown in FIG. 2(a) and FIG. 2(b) since the workpiece pusher pin is positioned to the right of the central axis (Y) (see FIG. 2(b)) so that a large side force component is applied against the side wall and interior bottom of rail 14b. Skewing the guide rails relative to horizontal enhances the kinetic friction force, which in turn, enhances rotation of the workpiece as it advances through the induction coil from the workpiece coil entry and exit positions. The apparatus can optionally included means for adjusting the skewing angle to suit a particular workpiece and heating process.

In all examples of the invention the kinetic friction force may be enhanced by coating at least some of the inner surfaces of the (high) friction rail (rails 14b and 15b in the above examples) that make contact with the workpiece with a high temperature, high kinetic friction coefficient material such as a thermal sprayed chromium oxide composition. In all examples of the invention the kinetic friction force of the opposing non-friction rail can be reduced by forming, or coating, the non-friction rail (rails 14a and 15a) with a high temperature, low kinetic friction coefficient material such as a polished ceramic. The function of the (low or) non-friction rail is to support the workpiece as it moves through the induction coil and not to restrain movement of the workpiece; this function is further illustrated in FIG. 2(b) and FIG. 3 where the side of the workpiece may be offset from the facing interior side of the non-friction rail (14a and 15a) by distances $d_1$ and $d_2$ respectively. Preferably the kinetic friction coefficient of the surfaces of the friction rail that makes contact with the workpiece should be at least 0.25. As an alternative to coating, these rail friction surfaces can be machined, for example, by knurling, or other surface roughing processes to achieve the required kinetic friction coefficient for the friction rail. For workpiece tempering processes, the temperature withstand of both the rails (and coatings, if used) is generally greater than 800° C., and for workpiece metallurgical hardening processes, generally greater than 1,000° C.

FIG. 4 illustrates another apparatus of the present invention where belt or chain 22' is a continuously driven (driver not shown in the figure) chain and each pin 20' attached to the chain is arranged to pickup (push) a workpiece 90c from workpiece supply station 30 at entry to induction coil 12 and release the workpiece at exit 32 from the induction coil.

In some examples of the invention, pin 20 may alternatively comprise a freely rotating spool mounted on a spindle so that the spool does not resist rotational motion of workpiece. Alternatively the spool (or wheel) making contact with the side of the workpiece may be connected to a spindle that is gear-driven along a rack as the spool and engaged workpiece advance through the induction coil. In this arrangement the driven spool (wheel) making contact with the side of the workpiece can rotate at the same tangential velocity as that of the workpiece being rotated.

Figure 5:
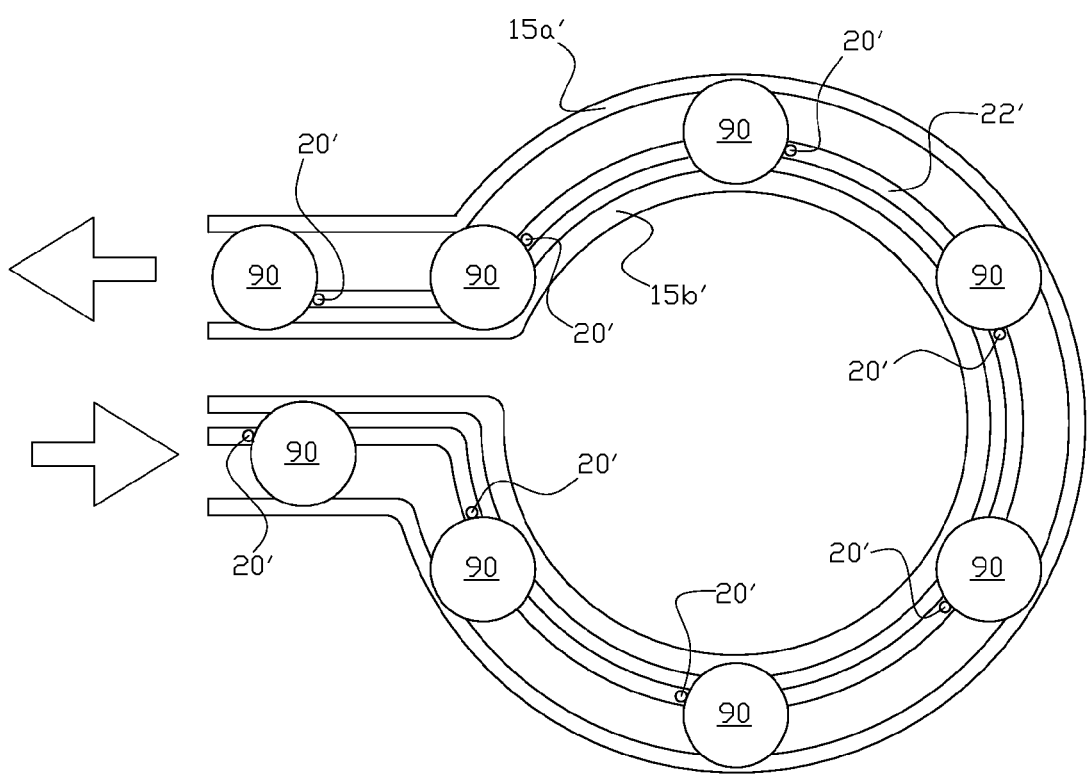
FIG. 5 is a top plan view of another apparatus of the present invention for inductively heat treating a cylindrical workpiece or the cylindrical component of a complex workpiece.

FIG. 5 illustrates an alternative embodiment of the invention where guide rails 15a' and 15b' are curved to form a circular track for workpieces 90. The curved guide rails may be arranged in a three dimensional helical track. In the particular arrangement shown in FIG. 5, since pins 20' (connected to drive 22') are located to the left of the workpiece central axis (Y) the friction rail will be outer curved guide rail 15a'. As in the above examples of the invention, rails 15a' and 15b' may be skewed in orientation to increase the friction forces between a workpiece and the friction guide rail 15a'.

The term "circular workpiece" as used herein includes cylindrically shaped workpieces, including right cylindrically shaped workpieces, ellipsoidal workpieces, and workpieces that have one or more circular components where each circular component is either heated separately from other workpiece components, or in combination with other workpiece components.

While the above examples of the invention illustrate induction heating with a channel inductor, the present invention may be applied to other inductor arrangements, for example, flat pancake-shaped, split-return and other coil arrangements, as long as the guide rails and pusher elements as disclosed herein can be applied. Further the inductor arrangement may comprise multiple coils of different types. While the above examples of the invention illustrate three workpieces passing through the induction coil arrangement at the same time, the apparatus may be arranged to accommodate as many workpieces passing through the inductor coil arrangement at the same time as desired. Further although a straight linear track is shown in the figures, the track may be arranged in a serpentine series of linear track segments where induction coils of different power and frequency output are used along different track segments to provide a workpiece heating profile for a particular application.

The present invention has been described in terms of preferred examples and embodiments. Equivalents, alternatives and modifications, aside from those expressly stated, are possible and within the scope of the invention.

The invention claimed is:

1. A method of induction heat treatment for a circular workpiece, the method comprising the steps of:
   placing the circular workpiece on a horizontal and lateral support structure disposed within an induction coil with a side wall of the circular workpiece vertically oriented to transport the circular workpiece from a coil entry position to a coil exit position; and
   contacting the side wall of the circular workpiece with a workpiece pusher element that is not directed through the central axis of the circular workpiece the workpiece pusher element connected to a drive apparatus for moving the workpiece pusher element through the induction coil so that contacting the side wall of the circular workpiece with the workpiece pusher element simultaneously rotates the circular workpiece in the horizontal and lateral support structure and advances the circular workpiece through the induction coil.

2. The method of claim 1 wherein the step of contacting the side wall of the circular workpiece is initiated when the circular workpiece is at the coil entry position.

3. The method of claim 1 wherein the horizontal and lateral support structure comprises a first and a second horizontally oriented guide rails, the first and the second horizontally oriented guide rails disposed at opposing tangents of the circular workpiece, the method further comprising the step of skewing the first and the second horizontally oriented guide rails from horizontal by raising one of the first or second horizontally oriented guide rail horizontally above the other one of the first or second horizontally oriented guide rail so that the circular workpiece exerts a greater side force on the first horizontally oriented guide rail than on the second horizontally oriented guide rail.

4. The method of claim 3 wherein the step of contacting the side wall of the circular workpiece is performed when the circular workpiece is at the coil entry position.

5. An induction heat treatment apparatus for a circular workpiece, the induction heat treatment apparatus comprising:
   an induction coil;
   a horizontal and lateral support structure disposed within the induction coil for transporting the circular workpiece disposed on the horizontal and lateral support structure through the induction coil;
   a workpiece pusher element; and
   a drive apparatus connected to the workpiece pusher element and oriented so that the workpiece pusher element engages a side wall of the circular workpiece and applies a force that is not directed through the central axis of the circular workpiece to simultaneously rotate the circular workpiece in the horizontal and lateral support structure and advance the circular workpiece through the induction coil when the drive apparatus is activated.

6. The induction heat treatment apparatus of claim 5 further comprising at least one alternating current power source connected to the induction coil.

7. The induction heat treatment apparatus of claim 5 wherein the induction coil comprises an at least one channel induction coil.

8. The induction heat treatment apparatus of claim 5 wherein the horizontal and lateral support structure comprises a first and a second horizontally oriented guide rails, the first and the second guide rails disposed at opposing tangents of the circular workpiece.

9. The induction heat treatment apparatus of claim 8 wherein the workpiece pusher element comprises a pin or a post and the drive apparatus comprises a powered belt or chain drive.

10. The induction heat treatment apparatus of claim 8 wherein the workpiece pusher element comprises a rotating spool on a spindle.

11. The induction heat treatment apparatus of claim 8 wherein the workpiece pusher element comprises a driven spool rotating at the same tangential velocity as that of the circular workpiece making contact with the driven spool.

12. The induction heat treatment apparatus of claim 8 wherein the first and the second horizontally oriented guide rails are arranged to skew the circular workpiece disposed on the first and the second guide rails from horizontal by raising the second horizontally oriented guide rail horizontally above the first horizontally oriented guide rail so that the circular workpiece disposed on the first and the second horizontally oriented guide rails applies a first friction side force on the first guide rail greater than a second friction side force on the second guide rail.

13. The induction heat treatment apparatus of claim 12 further comprising a high friction coating on a surface of the first horizontally oriented guide rail at least partially where the first friction side force is applied, the high friction coating having a kinetic friction coefficient of at least 0.25 and a temperature withstand of at least 800° C.

14. The induction heat treatment apparatus of claim 13 wherein the high friction coating comprises a thermal sprayed chromium oxide composition.

15. The induction heat treatment apparatus of claim 12 further comprising a low friction coating on a surface of the second horizontally oriented guide rail at least partially where the circular workpiece makes contact with the second horizontally oriented guide rail, the low friction coating having a temperature withstand of at least 800° C.

16. The induction heat treatment apparatus of claim 15 wherein the low friction coating comprises a polished ceramic composition.

17. The induction heat treatment apparatus of claim 12 wherein a machined rough surface is provided on a surface of the first horizontally oriented guide rail at least partially where the first friction side force is applied, the machined rough surface having a kinetic friction coefficient of at least 0.25.

18. The induction heat treatment apparatus of claim 6 wherein the induction coil and the horizontal and lateral support structure are circular in shape.

19. The induction heat treatment apparatus of claim 6 wherein the induction coil and the horizontal and lateral support structure are helical in shape.

20. A method of induction heat treatment for a workpiece having at least one circular component, the method comprising the steps of:
   placing the at least one circular component on a horizontal and lateral support structure disposed within an induction coil with a side wall of the circular component vertically oriented to transport the circular component from a coil entry position to a coil exit position; and contacting the side wall of the circular component with a workpiece pusher element that is not directed through the central axis of the circular component the workpiece pusher element connected to a drive apparatus for moving the workpiece pusher element through the induction coil so that contacting the side wall of the circular component with the workpiece pusher element simultaneously rotates the circular workpiece in the horizontal and lateral support structure and advances the circular workpiece through the induction coil.

* * * * *